(12) United States Patent
Taylor et al.

(10) Patent No.: US 11,138,556 B2
(45) Date of Patent: Oct. 5, 2021

(54) SYSTEM AND METHOD FOR ITERATIVE IMPROVEMENTS TO PRE-COUNT INVENTORY RULES

(71) Applicant: Walmart Apollo, LLC, Bentonville, AR (US)

(72) Inventors: Robert Taylor, Rogers, AR (US); Justin Smith, Bentonville, AR (US); Smita Sharda, Bentonville, AR (US); Jyoti Malik, Bentonville, AR (US); Megan Humphreys, Twinsburg, OH (US); Joshua Ridgeway, Lowell, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 230 days.

(21) Appl. No.: 16/212,091

(22) Filed: Dec. 6, 2018

(65) Prior Publication Data

US 2019/0172004 A1 Jun. 6, 2019

Related U.S. Application Data

(60) Provisional application No. 62/595,382, filed on Dec. 6, 2017, provisional application No. 62/595,387, filed on Dec. 6, 2017.

(51) Int. Cl.
*G06Q 10/08* (2012.01)
*G06Q 10/06* (2012.01)
*G06Q 10/10* (2012.01)

(52) U.S. Cl.
CPC ....... *G06Q 10/087* (2013.01); *G06Q 10/0635* (2013.01); *G06Q 10/1097* (2013.01)

(58) Field of Classification Search
CPC ............ G06Q 10/087; G06Q 10/0635; G06Q 10/1097; G06Q 10/06; G06Q 10/08; G06Q 10/10

(Continued)

(56) References Cited

U.S. PATENT DOCUMENTS 5,570,291 A   10/1996  Dudle et al.
5,819,232 A * 10/1998  Shipman .............. G06Q 20/203
                                                          705/7.24

(Continued)

OTHER PUBLICATIONS

Kris Lange, Oracle Retail Store Inventory Management, 2014, Oracle, Release 14.1 (Year: 2014).*

(Continued)

*Primary Examiner* — Andrew Joseph Rudy
(74) *Attorney, Agent, or Firm* — Duane Morris LLP; Manita Rawat (57) ABSTRACT

Systems, methods, and computer-readable storage media for providing adequate instructions to conduct an inventory of a store, and specifically a pre-inventory of difficult to count items. As store are selected for performing an inventory, instructions to perform pre-counts of specific items are sent. As the pre-count begins, videos, text, or other materials needed to perform a complete pre-count are distributed to the store associate performing the pre-count task. If the pre-count is outside pre-defined thresholds, an additional task to re-count the item may be assigned. Based on these actions, the set of rules used to identify when the re-count should occur can be modified.

18 Claims, 6 Drawing Sheets

(58) Field of Classification Search
USPC .................. 705/7.21; 709/217, 223–229
See application file for complete search history.

(56) References Cited

U.S. PATENT DOCUMENTS

| | | | | |
|---|---|---|---|---|
| 6,574,605 | B1* | 6/2003 | Sanders | G06Q 30/04 705/7.26 |
| 6,996,538 | B2 | 2/2006 | Lucas | |
| 7,383,355 | B1* | 6/2008 | Berkman | G06F 9/541 709/201 |
| 7,475,051 | B1* | 1/2009 | Laxminarayan | G06Q 20/14 706/47 |
| 7,552,066 | B1 | 6/2009 | Landvater | |
| 7,590,653 | B2* | 9/2009 | Sparks | H04L 41/12 |
| 7,765,135 | B2 | 7/2010 | Hurwitz et al. | |
| 7,957,998 | B2 | 6/2011 | Riley et al. | |
| 8,019,828 | B2* | 9/2011 | Cash | G06Q 40/02 709/217 |
| 8,983,647 | B1* | 3/2015 | Dwarakanath | G05D 1/0217 700/216 |
| 9,026,631 | B2* | 5/2015 | Burckart | G06Q 10/087 709/223 |
| 9,280,757 | B2* | 3/2016 | Parpia | G06Q 10/087 |
| 9,679,320 | B2* | 6/2017 | Harper | G06Q 20/201 |
| 2002/0010659 | A1 | 1/2002 | Cruse et al. | |
| 2002/0188499 | A1* | 12/2002 | Jenkins | G06Q 10/087 705/28 |
| 2003/0216969 | A1* | 11/2003 | Bauer | H01Q 7/00 705/22 |
| 2004/0186794 | A1 | 9/2004 | Renz et al. | |
| 2005/0203790 | A1 | 9/2005 | Cohen | |
| 2006/0244482 | A1* | 11/2006 | Peterson | H03K 19/17744 326/38 |
| 2008/0120129 | A1* | 5/2008 | Seubert | G06Q 10/10 705/35 |
| 2008/0255968 | A1 | 10/2008 | Heinrichs | |
| 2010/0138281 | A1* | 6/2010 | Zhang | G06Q 20/203 705/28 |
| 2013/0144435 | A1* | 6/2013 | Czaplewski | G06F 19/00 700/241 |
| 2013/0339199 | A1 | 12/2013 | Patt et al. | |
| 2014/0084060 | A1* | 3/2014 | Jain | G06K 7/10009 235/385 |
| 2014/0344118 | A1* | 11/2014 | Parpia | G06Q 10/087 705/28 |
| 2014/0374478 | A1 | 12/2014 | Dearing et al. | |
| 2015/0324779 | A1 | 11/2015 | Gala | |
| 2016/0171428 | A1 | 6/2016 | Gooijer et al. | |
| 2017/0032313 | A1 | 2/2017 | McCullough et al. | |
| 2018/0189760 | A1* | 7/2018 | Brooks | G06Q 20/202 |
| 2018/0204282 | A1* | 7/2018 | Painter | G06Q 20/322 |

OTHER PUBLICATIONS

International Search Report and Written Opinion dated Feb. 4, 2019, issued in corresponding PCT Application No. PCT/US2018/064249.

International Search Report and Written Opinion dated Feb. 4, 2019, issued in corresponding PCT Application No. PCT/US2018/064246.

* cited by examiner

SYSTEM AND METHOD FOR ITERATIVE IMPROVEMENTS TO PRE-COUNT INVENTORY RULES

CROSS REFERENCE TO RELATED APPLICATIONS

This present Patent Application claims priority benefit from U.S. Provisional Patent Application Nos. 62/595,382 filed on Dec. 6, 2017, and 62/595,387 filed on Dec. 6, 2017, the entire content of which are hereby incorporated herein by reference.

BACKGROUND

1. Technical Field

The present disclosure relates to inventory systems, and more specifically to iterative improvements to pre-count inventory rules.

2. Introduction

Taking inventory over a large store can be a time consuming process. Often, taking a complete inventory of a store can require working during off hours, hiring a third party to perform the inventory, and/or devoting multiple personnel to performing the inventory. Even with these efforts, the nature of some items makes taking a complete and accurate inventory difficult. For example, items stored in end-caps, sidekicks, stack bases, or bins can be time consuming to inventory, making day-of inventory difficult to perform.

To account for the difficulty of performing day-of inventory of such items, the use of pre-counts is often done, where before the full inventory occurs, store associates will count the items. However, whether this occurs a day, a week, or a month before the full inventory, the amounts actually being stored may change prior to the full inventory occurring. Based on intermediate in-store sales which occur between the pre-count and the full inventory, historical data, and inherent difficulty in counting such items, human beings reviewing the inventory counts can determine if a particular fixture of items should be recounted as part of the inventory.

SUMMARY

A method of performing concepts disclosed herein can include: receiving, at a server, a schedule for performing inventory at each store in a plurality of stores; receiving, at the server, a store type for each store in the plurality of stores; receiving, at the server and from each store in the plurality of stores, product data for each product sold in a respective store, the product data comprising, for the each product: a product type; at least one product location; and at least one fixture type for the at least one product location; identifying, via a processor on the server and based on the schedule, an upcoming inventory for a specific store in the plurality of stores, the upcoming inventory scheduled for a date; identifying, via the processor on the server and based on pre-inventory rules compared to the store type, the product type, the at least one product location, and the at least one fixture type of each product within the specific store, products inventoried within the specific store which require a pre-inventory count, to yield required pre-count tasks; transmitting, from the server and to the specific store prior to the date of the upcoming inventory: the required pre-count tasks, to yield task assignments; and store specific instructions for each of the task assignments, the store specific instructions based on the product type, the at least one product location, and the at least one fixture type; and receiving, from the specific store and in response to transmission of the task assignments and the store specific instructions, pre-count inventory amounts for the products inventoried within the specific store which require the pre-inventory count.

A system configured according to this disclosure can include: a processor; and a computer-readable storage device having instructions stored which, when executed by the processor, cause the processor to perform operations comprising: receiving a schedule for performing inventory at each store in a plurality of stores; receiving a store type for each store in the plurality of stores; receiving, from each store in the plurality of stores, product data for each product sold in a respective store, the product data comprising, for the each product: a product type; at least one product location; and at least one fixture type for the at least one product location; identifying, based on the schedule, an upcoming inventory for a specific store in the plurality of stores, the upcoming inventory scheduled for a date; identifying, based on pre-inventory rules compared to the store type, the product type, the at least one product location, and the at least one fixture type of each product within the specific store, products inventoried within the specific store which require a pre-inventory count, to yield required pre-count tasks; transmitting, to the specific store prior to the date of the upcoming inventory: the required pre-count tasks, to yield task assignments; and store specific instructions for each of the task assignments, the store specific instructions based on the product type, the at least one product location, and the at least one fixture type; and receiving, from the specific store and in response to transmission of the task assignments and the store specific instructions, pre-count inventory amounts for the products inventoried within the specific store which require the pre-inventory count.

A computer-readable storage device configured according to this disclosure can have instructions stored which, when executed by a computing device, cause the computing device to perform operations comprising: receiving a schedule for performing inventory at each store in a plurality of stores; receiving a store type for each store in the plurality of stores; receiving, from each store in the plurality of stores, product data for each product sold in a respective store, the product data comprising, for the each product: a product type; at least one product location; and at least one fixture type for the at least one product location; identifying, based on the schedule, an upcoming inventory for a specific store in the plurality of stores, the upcoming inventory scheduled for a date; identifying, based on pre-inventory rules compared to the store type, the product type, the at least one product location, and the at least one fixture type of each product within the specific store, products inventoried within the specific store which require a pre-inventory count, to yield required pre-count tasks; transmitting, to the specific store prior to the date of the upcoming inventory: the required pre-count tasks, to yield task assignments; and store specific instructions for each of the task assignments, the store specific instructions based on the product type, the at least one product location, and the at least one fixture type; and receiving, from the specific store and in response to transmission of the task assignments and the store specific instructions, pre-count inventory amounts for the products inventoried within the specific store which require the pre-inventory count.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

To conduct a full inventory of a store is generally a human-intensive operation, particularly for hard-to-count items. Because of time constraints on the day of the full-inventory, pre-counts of certain items often take place prior to the full-inventory. To improve on the pre-count process, one can implement concepts and ideas disclosed herein. Consider the following example. A system, such as a computer server or other computer device, can import an inventory schedule outlining when the inventory will take place. With this inventory schedule can be a list of tasks which need to be performed before the full-inventory takes place. These tasks can be assigned because they will take too long during the full-inventory, are of particular interest/value to the system based on shelf-life or value, and/or are easily tracked by inventory systems (and therefore their values are unlikely to vary prior to the full-inventory).

The list of tasks to be accomplished prior to the full-inventory ("pre-count tasks") can be received by the store manager or store management, who can then assign pre-count tasks to store associates. The store associates can then receive, on their individual mobile devices (smart phones, MC40s, etc.), the task assignment as well as particular instructions on how to best accomplish the task. These particular instructions can include, for example, directions to the location for the task, a picture of the item to be pre-counted, instructions/warnings on how to best conduct the actual counting, a modular hierarchy of the item to be counted (i.e., department>shelving area>modular area).

Consider the following example. The manager of a store receives a list of tasks to accomplish prior the full-inventory occurring in a month. These tasks can be sent from a central computing system to multiple stores based on store type, such that the list of tasks varies from store-to-store, region-to-region, based on the types of products and capacities of the individual store types. The list of tasks can include pre-count inventory tasks which are divided into timing hierarchies of 30 days out (i.e., pre-counts to accomplish 30 days prior to the full-inventory), 14 days out, and 1 day out. The tasks may likewise be organized based on the location of the physical goods to be counted (i.e., trailer, stock room, bin, modular, etc.). The manager can assign the tasks, which appear on the store associate's mobile device at the appropriate time for the store associate to perform the task.

Upon selecting to perform a pre-count task (or being assigned the pre-count task), the associate moves to the product location identified in the instructions. To perform the pre-count task, the store associate can scan the item (or more precisely, a bar-code associated with one of the items), and follow the instructions provided on their mobile device. A database may store, for example in a table, items, store locations, and associate these the respective instructions. In some cases, these instructions can provide illustrations of the item to be counted, text instructions particular to the product, illustrations or video of how to perform the actual pre-count, etc. Upon completing the counting, the store associate enters the pre-count of the inventory into the system using their mobile device (or other computing device).

The system then compares the pre-count of the product to various metrics to determine if the pre-count is outside of certain thresholds, which would cause the pre-count to need to be performed again. For example, the metrics can include the shelf limit for the product, the previous shipment quantity, historical averages, sales data, etc. A second table may associate the metrics with item for the pre-count.

Whereas in previous solutions human beings were required to evaluate such features based on feelings (i.e., does this seem right?), the present disclosure relies on a set of rules which allow a computer to evaluate if the pre-count is trustworthy. These rules are then updated and modified based on iterative machine learning. More specifically, when the pre-count analysis, based on the set of rules, identifies a particular product's precount as needing to be re-counted, the system will then receive a new count of the product. Based on that new count and the original pre-count, as well as the other data (shipment information, in-store sales, etc.), the system can modify the set of rules. For example, if the re-count of the pre-counted item indicates that the audit (or recounting) of the item was not needed, and the original pre-count was correct, the system can modify the set of rules such that in future iterations the pre-count would not have been audited. However, likewise, if the re-count indicated that the original pre-count was incorrect, the system will likely not modify the set of rules, as the rules correctly identified an item as needing to be re-counted. Embodiments of the invention use associations between different types of stored data, such as the items in inventory, inventory tasks, audit rules, and rule modifications, to allow the system to quickly and efficiently process the inventory data.

The determination as to whether an item should be audited/recounted can, in some configurations, be based on a weighted equation with factors such as:

pre-count amount
sales since last inventory
shipments sizes since last inventory
most recent shipment
shelf limit
end-cap amounts
store type When the system determines that modification to the system rules needs to occur, the system can modify the code or database containing the pre-count rules, thereby modifying the amounts at which certain thresholds are triggered and the re-counting of the pre-count is tasked. Similarly, if using a weighted equation, the system can modify the code which sets the weights applied to any given factor. In other words, modification to the rules can include modifying the code or stored information such that when a processor or other computing device executes the rules the rules execute modified code and (possibly) provide a distinct result.

The results of the pre-count, as well as the full inventory, can be stored and shared in a cloud-based system, such that as the associate makes the pre-count inventory the results are automatically transmitted from the associate's mobile device to the cloud and, if necessary, additional instructions can be sent to the store manager. When a re-count needs to be conducted, the manager would again make the assignment based on a task received from the central system. However, in this case, to avoid misconduct, the task can block the store associate who conducted the pre-count from being the same associate who conducts the re-count. To ensure this, the manager's software can explicitly block the first associate from being selected for the re-count. In yet other tasks, the manager may be required to perform the audit.

When items are located in a store which are not typically in the system inventory for that store type or location the system can create a temporary inventory of that item. This can include, for example, regional/seasonal items which are returned to a store, forgotten/left-over items, etc. When the pre-count for the inventory is initiated, the system can task pre-counts for these temporary/non-standard items as well as standard items.

When the full-inventory is conducted, the values from the pre-count tasks which have been uploaded into the system are automatically incorporated into the full-inventory. For example, if a full report is being generated based on the full-inventory, the pre-count values will be used in producing the full report. In instances where sales data has changed the pre-count value, the report can rely on a combination of intermediate sales data and the pre-count value.

Storage of information, both before, during, and after the counting process, occurs in the cloud, which has multiple technical advantages over node-based or store-side data storage and processing. Specifically, node-based or store-based data storage and processing can lead to processing bottlenecks, slow processing speed, store system failures, etc., whereas cloud-based systems can ramp data storage and processing up or down, based on real-time demand. In addition, for other store processes and functions, the most critical in-store function is that the cash registers at the point of sale are able to correctly process customer baskets, accept payment, etc. Store-based processing of the data, as disclosed herein, could impair those register sales from being correctly processed. Specifically, tests have shown that executing rules such as those disclosed herein have resulted in store systems slowing and multiple services being impacted. Moving such rules to the cloud mitigates such risk. In addition, having cloud based processing mitigates the risk of the failure of any single server's crash, which could otherwise disrupt completion of the processes disclosed herein. Thus, embodiments of the invention structure applications to selectively run on remote locations, such as the cloud, instead of at store locations. This structuring allows the systems to correctly process in-store transaction more quickly and accurately.

The rules used to configure tasks, assignments, timing of messages, instructions, etc., can be modified using artificial intelligence (AI) algorithms. In some configurations, these AI algorithms can automatically modify the rules as needed, or on a periodic basis, whereas in other configurations the AI algorithms can make recommendations which are reviewed by human supervisors. For example, in one configuration, the suggestions produced by the AI are reviewed by a human supervisor every three months, every week, or every day, before being finalized (i.e., before overwriting the original rule with a new rule). In some configurations, these rules are run on a server side such that any rule changes (such as when to initiate a recount), are reflected immediately.

Exemplary factors to evaluate the effectiveness of a rule can include the number of recounts/discrepancies generated; the amount of work generated, based on specific or average task completion time; quantity or amount of recounts that resulted in a discrepancy; difference between inventory service counts ($3^{rd}$ party counts) and store counts (counting performed by store associates), in terms of quantity and financial difference; counter accuracy, both specific and general for multiple counters, and which may be for a single store or multiple stores; and item characteristics (department, category, hazard class, value).

Figure 1:
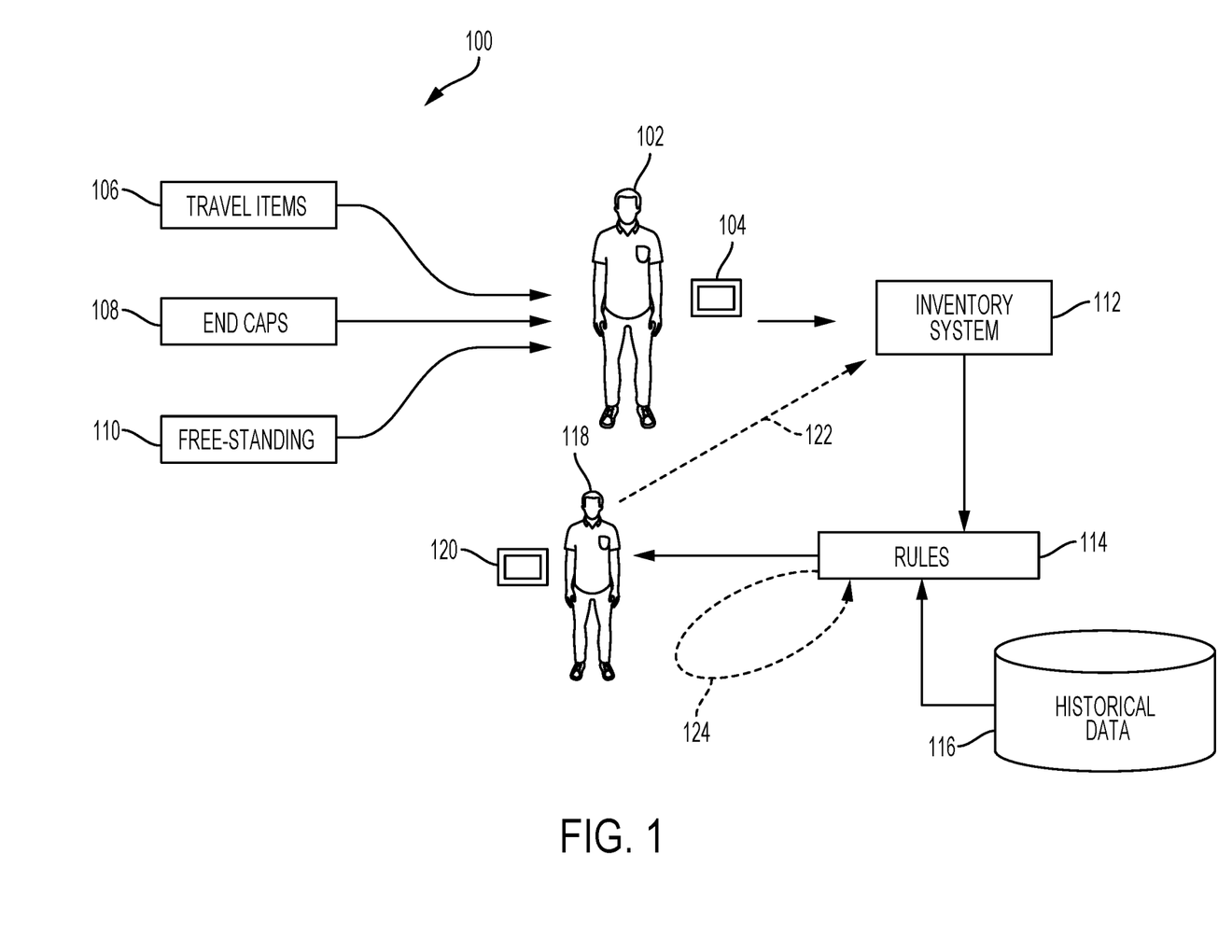
FIG. 1 illustrates an example system architecture.

The disclosure now turns to FIG. 1. FIG. 1 illustrates an example system architecture 100. In this architecture 100, once a store associate 102 is assigned to perform tasks, the data associated with individual tasks is uploaded from a central server or other to a mobile device 104 belonging to the store associate 102. This task information provides details which the store associate can use to be perform the assigned task, such as information regarding the type of item to be counted (i.e., travel items 106), fixture types (i.e., end caps 108 or free-standing displays 110), or locations of the items.

The store associate 102 performs the assigned task (counting the number of items in a bin, etc.), then enters the quantity into their mobile device 104. The mobile device 104 transmits the data to an inventory system 112, which records the pre-count quantity within a non-transitory memory device. The inventory system 112 or another computing system then apply rules 114 to the pre-count quantity to identify if the amount recorded by the associate 102 is outside a predicted range, and therefore needs to be recounted. These rules can rely on historical data 116, such as store sales, shelf limits, shipping information, previous quantity, etc., in making the determination if the amount should be re-counted. Exemplary rules can include:

If pre-count quantity>shelf limits, re-count the item
If pre-count quantity>shipment quantity, re-count the item
If dollar value of pre-count items<predicted dollar value, re-count the item
If the absolute value of (predicted quantity minus pre-count quantity)/predicted quantity>threshold percentage, re-count the item
If the absolute value of (predicted quantity minus pre-count quantity)>threshold, re-count the item The results of counts (pre-counts and re-counts) can be shared among the retailer, third parties, multiple stores, etc., using a cloud based real-time data system. APIs (Application Programming Interfaces) can be used to share the data, and the Content Management System can analyze the results of the counts to determine which additional tasks to order and when to order those tasks. In some cases, the system allows for specific areas of the store to be counted, then tasks/counts from those areas can be delivered and/or received as a batch.

If the product needs to be re-counted, a new task is assigned to a different store associate 118 by sending the task to the store associate's mobile device 120. At this point the second store associate 118 performs the task (i.e., counting the number of products at the designated location) and sends 122 the second count to the inventory system 112. If the first and second counts of the product match, the inventory system can conclude that the count is correct, and if necessary, can cause the rules 114 to be updated 124, such that the code for implementing the rules is overwritten/modified. In some instances, the counts may not match, and depending on the disparity, management or other personnel may be assigned to confirm the actual quantity of the items.

Figure 2:
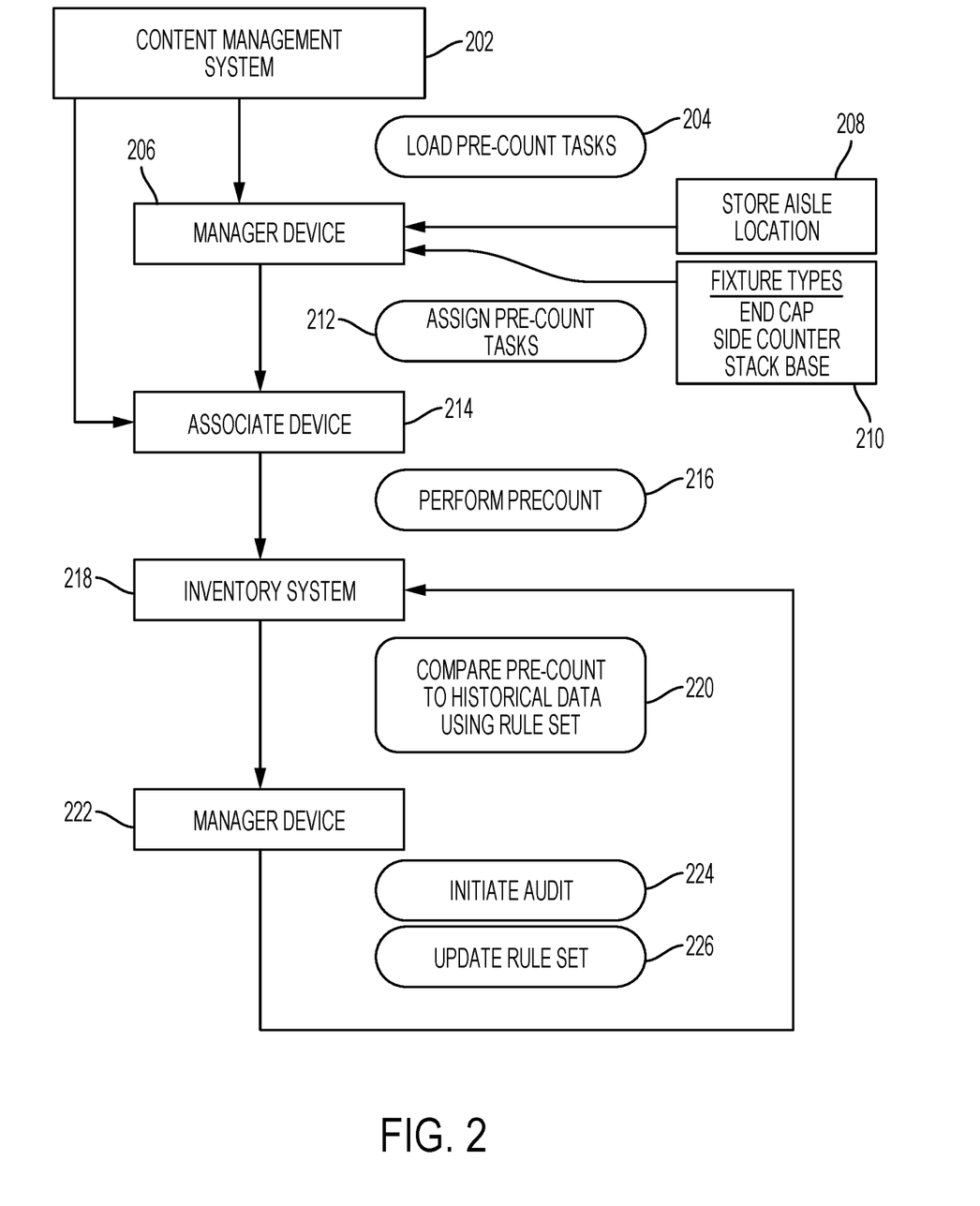
FIG. 2 illustrates a first exemplary data flow between devices and systems.

FIG. 2 illustrates a first exemplary data flow between devices and systems. In this example, a content management system 202 coordinates the assigned tasks to be completed before a full-inventory of a store occurs. The content management system 202 can, in some configurations, be configured to automatically make assignments for multiple stores using rules which take into account specifics of each store (i.e., when the inventory is going to be performed, location, region, etc.) and the type of the store receiving the assignments. The content management system 202 can load pre-count tasks 204 onto a manager device 206, allowing the manager to make assignments to store associates. To aid the manager in making the assignments, information such as the store aisle locations 208 of the individual products, the fixture types (end-cap, side counter, stack base, etc.) 210, type of product, value of the product, etc., can be loaded into the manager device from the content management system 202 or another database. The manager assigns the pre-count tasks 212, resulting in the assigned tasks being communicated to the associate's device 214. The associate's device 214 receives data from the manager's device 206 and/or the central management system 202, and the associate performs the assigned pre-count 216. These same rules (and/or additional rules) which can be used to determine when, and how, the pre-count is done, can be used to determine when a re-count of the pre-counted items should be performed.

As the associate performs the pre-count 216, the quantities entered by the associate into their mobile device 214 are uploaded to an inventory system 218. The inventory system 218 compares the pre-count to historical data using a rule set 220, allowing the inventory system 218 to determine if the pre-count matches (or is within a threshold range) of an amount predicted by the inventory system 218. In instances where the pre-count does not match, the inventory system 218 sends an additional task to the manager device 222 to initiate an audit or recount of the product which was just pre-counted. In some cases, the inventory system 218 can randomly decide to recount items, even if within predicted thresholds.

The manager initiates the audit/recount 224 of the product, and uploads the resulting product count to the inventory system 218. In some cases, initiating the audit 224 can include the manager themselves counting and inventorying the item, whereas in other cases the manager can assign a different associate to perform the recount than the associate which performed the pre-count. When necessary, an update to the rule set 226 can occur, such that the updated rule set is used in future iterations when comparing the pre-count to predicted inventory amounts.

The updates to the rule set can be based on a particular item, or can be based on distinct items. For example, if a rule is modified regarding when travel deodorant should be re-counted after a precount, the system can likewise modify the rule for when travel shampoo should be re-counted. In this example, the reason for the rule change across distinct item types is a common category—travel items. Location, size, product type, shelf life, and price are additional examples of areas where modifying the rule for one product may result in modification of rules associated with other products.

Figure 3:
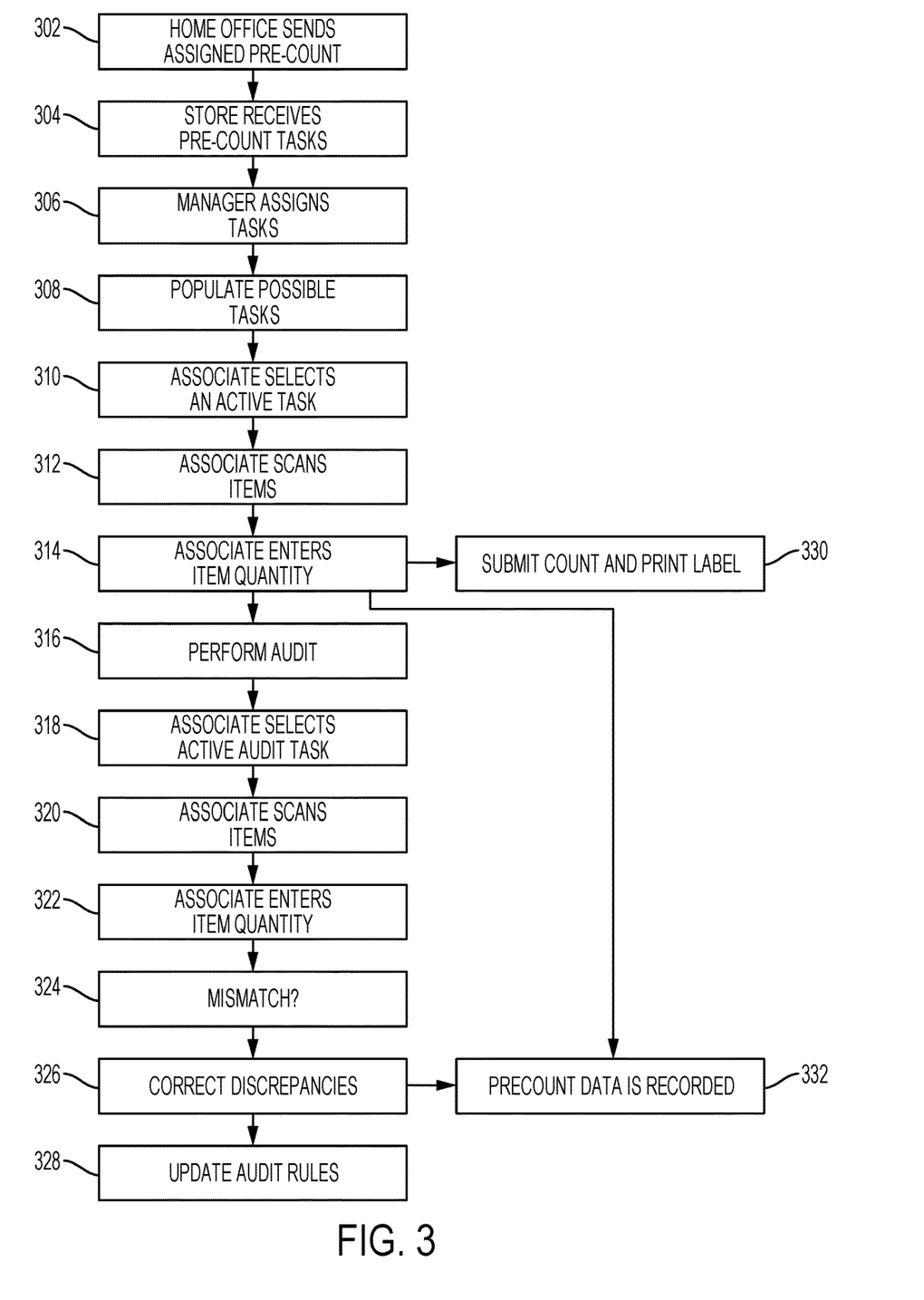
FIG. 3 illustrates a first example method embodiment.

FIG. 3 illustrates a first example method embodiment. In this example, the home office sends an assigned pre-count (302) task or assignment to a store. The store receives the pre-count tasks (304), and the manager assigns the tasks (306) to store associates. For example, the home office can be a server which automatically sends out pre-count assignment/tasks when an approaching inventory is within a threshold date range, and the store can receive the pre-count tasks on a store-specific server or computing system. Alternatively, the store may receive the pre-count tasks by the tasks being directly sent to a store computer, the manager's computer, the manager's mobile device, etc.

The manager can then populate the possible tasks (308), meaning the manager can assign tasks to specific associates which they manage. In other configurations, the manager may not need to make assignments, and instead the associates can self-select tasks to which they want to be assigned. From the tasks which associates are currently assigned (or which they have selected), the associate selects an active task (310). The system uploads information about how to accomplish the task to the associate's mobile device, which can include information regarding the location of the product which is going to be pre-counted, a video showing the associate how to best conduct the pre-count, etc. The tasks may be associated with the items in a database table, or other storage mechanism. When the associate arrives at the location of the product to be pre-counted, the associate scan the item (312), allowing the system to know that the correct item has been located. The associate counts the number of items, and enters the item quantity (314) into their mobile device. The associate's mobile device transmits the item quantity to an inventory service (or other computing system) configured to record the inventory numbers and determine if the pre-count is within a predicted range. The item may be associated with the pre-count analysis rules in a second table. Submitting the item count also allows the associate to print a label (330), indicating to those who perform the full-inventory at a later date that the item has been counted.

The inventory service, or other computing device which records the inventory quantities executes inventory specific rules to determine if the amount counted by the store associate was within a predicted range. This analysis (i.e., the comparison of the counted value to a predicted range or threshold) can trigger an assignment to perform an audit (316) on the item which was just pre-counted. For example, if the counted amount is higher than expected, lower than expected, or has other unexpected features, the analysis can trigger an assignment to re-count the pre-counted item. The system (meaning the inventory service which performed the rules analysis, or the home office) assigns a new task to perform the pre-count again. The manager can make the assignment to perform the task, different associates may choose the task, or the manager themselves may be assigned to complete the task. The assigned individual would then select the active audit task (318) from that individual's assigned tasks, and repeat the scanning (320) and entering of quantity (322) steps.

Once the second, recounted, pre-count has been entered, the system determines if there is a mismatch (324) between the first pre-count and the second pre-count. If there is not, then the system can accept the entered quantity as verified. If there is a mismatch, the system can take steps to correct the discrepancies (326). These steps can include yet another re-count, sending a manager or other trusted individual to count the items, accepting the second count as within a predicted range of inventory quantity, etc. The system can also update the audit rules (328) based on the results of the second (or subsequent) re-counts of the pre-count, such that future iterations will be more accurate in determining when to initiate the re-counts of pre-counted items. The system also records the pre-count data (332) and identifies the inventory of that item as complete.

Figure 4:
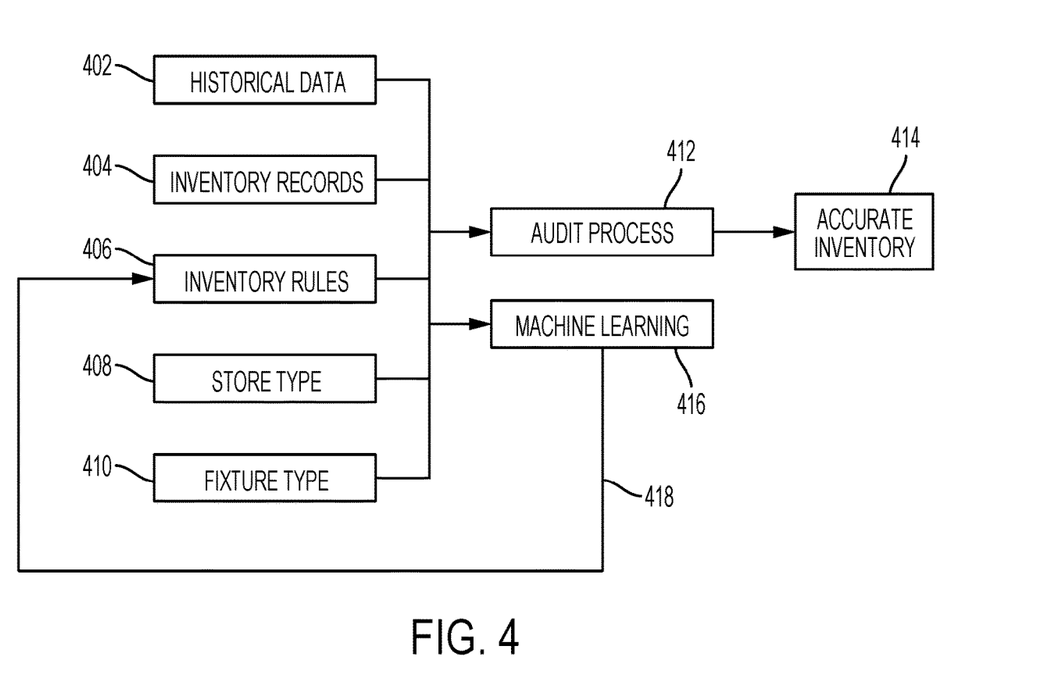
FIG. 4 illustrates a second exemplary data flow.

FIG. 4 illustrates a second exemplary data flow. This example illustrates how the analysis of the pre-count quantity operates in conjunction with machine learning/iterative improvements to the analysis. Data such as historical data 402, inventory records 404, current inventory rules 406, store type 408, and the fixture type 410 where the products are stored are combined to determine if the amount counted by the store associate during the pre-count is likely to be accurate. If not, the audit process 412 is initiated, ensuring an accurate inventory 414 is taken.

The combined data is also used to enable an iterative machine learning 416 process. This machine learning process uses particular data, such as historical data regarding sales of the product between the last inventory and the current pre-count, shipment information, shelf capacity, storage room capacity, re-stocking assignments, the store type, the fixture type where the product is displayed and stored for sales, etc. Each iteration of the pre-count process results in additional information which can be used to update 418 the inventory rules 406 which, when combined with the other data 402, 404, 408, 410, determine if an audit/re-count needs to occur. In some configurations, each iteration can cause an update to the inventory rules 406 via the machine learning 416. In other configurations, the system can record data from multiple iterations of the pre-count process, then update the inventory rules 406 using the machine learning 416 on a periodic basis. These iterations can, for example, be from a single product, store, or location, or preferably, are shared between stores, store types, and products based on relationships between products. For example, pre-count inventory rules for travel shampoo in a first store may be modified based on iterations of pre-counts for travel conditioner in a second store.

Modification of the inventory rules can include, for example, modifying the code which performs the analysis as to whether the product should be re-counted. In the past, humans determining if a re-count of pre-counted items needed to be performed simply decided if the pre-count "seemed right," and did not perform the analysis, or modification of that analysis, as described herein. By contrast, the automatic analysis, and iterative modification of the code to perform that automatic analysis, improves (over time) the computer's ability to predict when that re-count should occur.

Figure 5:
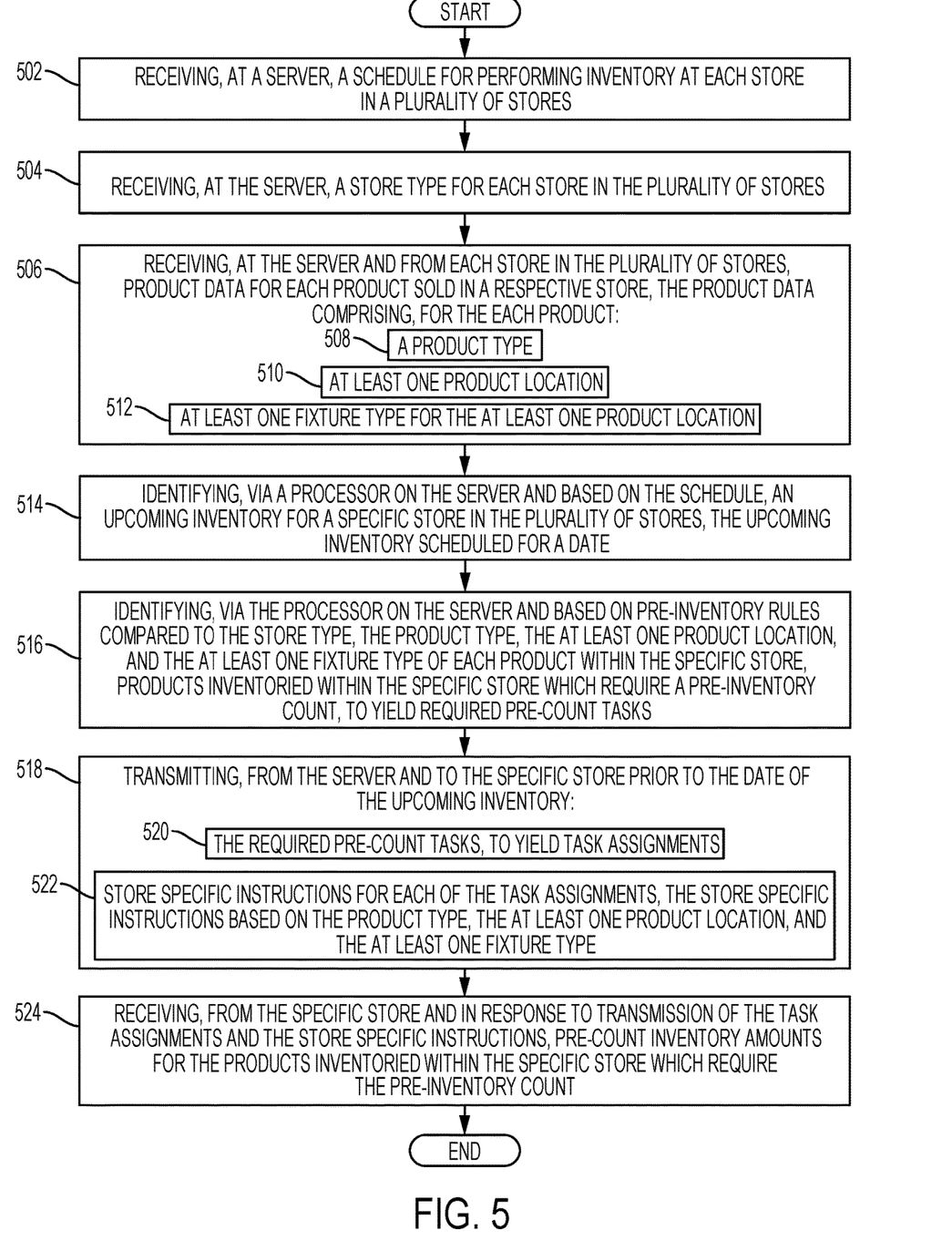
FIG. 5 illustrates a second example method embodiment.

FIG. 5 illustrates a second example method embodiment, and is performed by a server executing concepts as disclosed herein. The server receives a schedule for performing inventory at each store in a plurality of stores (502). The server also receives a store type for each store in the plurality of stores (504) and, from each store in the plurality of stores, product data for each product sold in a respective store, the product data comprising, for the each product (506): a product type (508), at least one product location (510); and at least one fixture type for the at least one product location (512). Exemplary fixture types can include a stackbase, an endcap, a sidecounter, and the at least one product location can include one or more of an aisle number, a department area, and a room type.

The server identifies, via a processor on the server and based on the schedule, an upcoming inventory for a specific store in the plurality of stores, the upcoming inventory scheduled for a date (514). The server also identifies, via the processor and based on pre-inventory rules compared to the store type, the product type, the at least one product location, and the at least one fixture type of each product within the specific store, products inventoried within the specific store which require a pre-inventory count, to yield required pre-count tasks (516). The server then transmits, from the server and to the specific store prior to the date of the upcoming inventory (518): the required pre-count tasks, to yield task assignments (520); and store specific instructions for each of the task assignments, the store specific instructions based on the product type, the at least one product location, and the at least one fixture type. Exemplary store specific instructions can include multi-modal instructions, wherein the multi-modal instructions have at least two of: images, text, and video.

In response to the pre-count tasks and store specific instructions which were transmitted, the server receives, from the specific store, pre-count inventory amounts for the products inventoried within the specific store which require the pre-inventory count (524).

The illustrated method can be further expanded by comparing the pre-count inventory amounts to a predicted inventory amount for each respective product in the products inventoried within the specific store which require a pre-inventory count, to yield a prediction comparison and initiating, based on the prediction comparison, an audit of a specific product in the products inventoried within the specific store which require a pre-inventory count. For example, this audit can be initiated due to a statistical difference between the predicted inventory amount and the pre-count inventory amount received for the specific product.

In some configurations wherein the type of store is one of a plurality of types of stores, each type of store having defined predefined departments associated with product locations.

In some configurations, the method can be further augmented by estimating, via the processor on the server, prior to the transmitting of the required pre-count tasks and the store specific instructions and based on the required pre-count tasks, a risk of pre-count inventory error; and in real-time as the pre-count inventory amounts are received, updating, via the processor on the server, the risk of pre-count inventory error based on the pre-count inventory amounts. In yet other configurations, the method can be added to by modifying the pre-inventory rules, via the processor on the server and based on the pre-count inventory amounts, such that future pre-count tasks and store specific instructions are generated in a distinct manner than they were in a first iteration.

Figure 6:
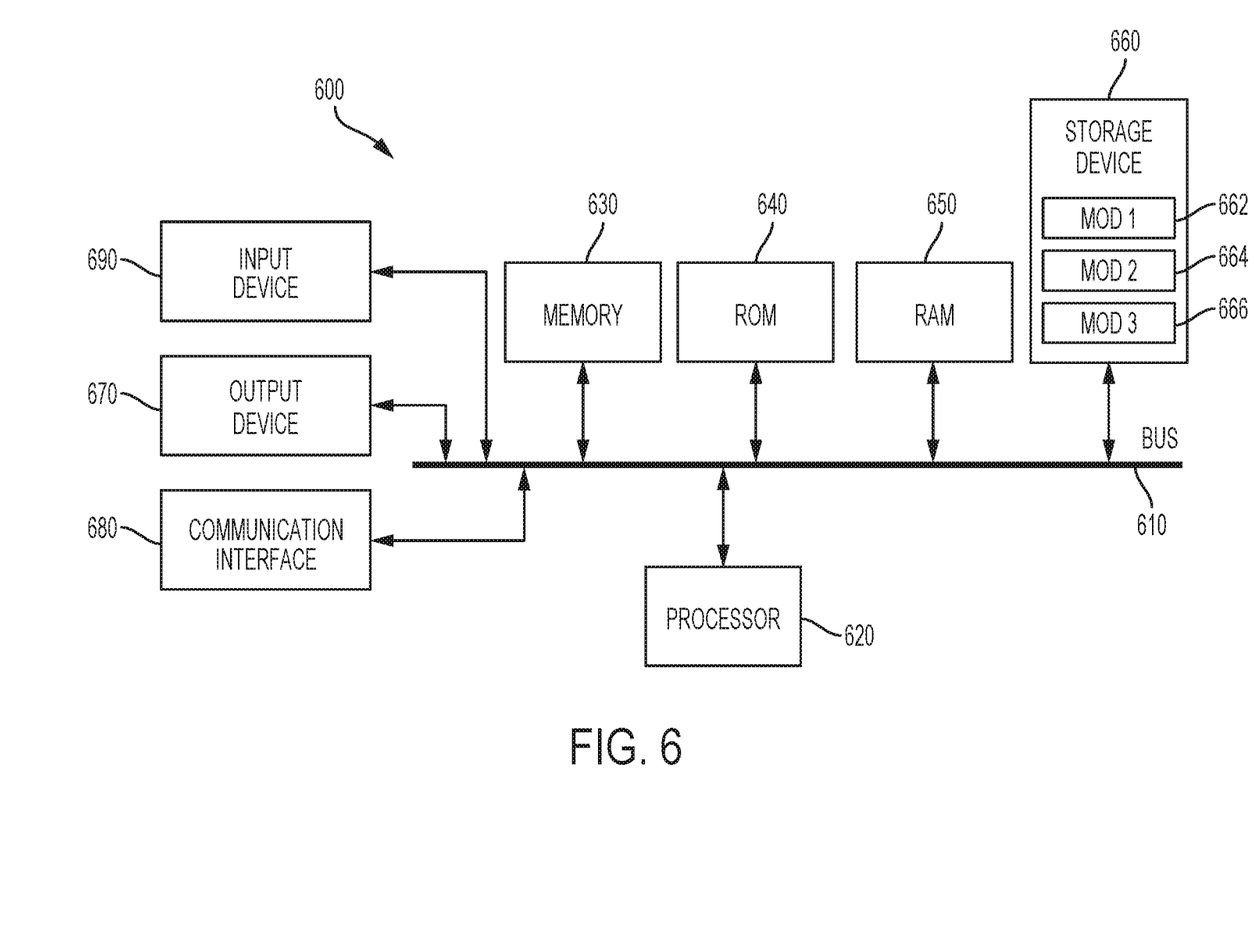
FIG. 6 illustrates an example computer system.

With reference to FIG. 6, an exemplary computer system includes a general-purpose computing device 600, including a processing unit (CPU or processor) 620 and a system bus 610 that couples various system components including the system memory 630 such as read only memory (ROM) 640 and random access memory (RAM) 650 to the processor 620. The system 600 can include a cache of high speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   receiving, at a server, a schedule for performing inventory at each store in a plurality of stores;
   receiving, at the server, a store type for each store in the plurality of stores;
   receiving, at the server and from each store system in the plurality of stores, product data for each product sold in a respective store, the product data comprising, for the each product:
   a product type;
   at least one product location; and
   at least one fixture type for the at least one product location;
   identifying, via a processor on the server and based on the schedule, an upcoming inventory for a specific store in the plurality of stores, the upcoming inventory scheduled for a date;
   retrieving, via the processor from a database, pre-inventory rules;
   identifying, via the processor on the server and based on the pre-inventory rules compared to the store type, the product type, the at least one product location, and the at least one fixture type of each product within the specific store, products inventoried within the specific store which require a pre-inventory count, to yield required pre-count tasks;
   transmitting, from the server and to the specific store system prior to the date of the upcoming inventory:
   the required pre-count tasks, to yield task assignments; and
   store specific instructions for each of the task assignments, the store specific instructions based on the product type, the at least one product location, and the at least one fixture type;
   receiving, from the specific store system and in response to transmission of the task assignments and the store specific instructions, pre-count inventory amounts for the products inventoried within the specific store which require the pre-inventory count;
   modifying, via the processor, the pre-inventory rules based on the pre-count inventory amounts, such that future pre-count tasks and store specific instructions are generated in a distinct manner, resulting in modified pre-inventory rules, resulting in modified pre-inventory rules; and
   storing the modified pre-inventory rules in the database for future iterations.

2. The method of claim 1, further comprising:
   comparing the pre-count inventory amounts to a predicted inventory amount for each respective product in the products inventoried within the specific store which require a pre-inventory count, to yield a prediction comparison;

initiating, based on the prediction comparison, an audit of a specific product in the products inventoried within the specific store which require a pre-inventory count.

3. The method of claim 2, wherein the audit of the specific product is initiated due to a statistical difference between the predicted inventory amount and the pre-count inventory amount received for the specific product.

4. The method of claim 1, wherein the at least one fixture type comprises one of a stackbase, an endcap, a sidecounter; and wherein the at least one product location comprises one of an aisle number, a department area, and a room type.

5. The method of claim 1, wherein the store specific instructions comprise multi-modal instructions, wherein the multi-modal instructions comprise at least two of: images, text, and video.

6. The method of claim 1, wherein the type of store is one of a plurality of types of stores, each type of store having defined predefined departments associated with product locations.

7. The method of claim 1, further comprising:
estimating, via the processor on the server, prior to the transmitting of the required pre-count tasks and the store specific instructions and based on the required pre-count tasks, a risk of pre-count inventory error; and
in real-time as the pre-count inventory amounts are received, updating, via the processor on the server, the risk of pre-count inventory error based on the pre-count inventory amounts.

8. A system comprising:
a processor; and
a computer-readable storage device having instructions stored which, when executed by the processor, cause the processor to perform operations comprising:
receiving a schedule for performing inventory at each store in a plurality of stores;
receiving a store type for each store in the plurality of stores;
receiving, from each store in the plurality of stores, product data for each product sold in a respective store, the product data comprising, for the each product:
a product type;
at least one product location; and
at least one fixture type for the at least one product location;
identifying, based on the schedule, an upcoming inventory for a specific store in the plurality of stores, the upcoming inventory scheduled for a date;
retrieving, from a database, pre-inventory rules;
identifying, based on the pre-inventory rules compared to the store type, the product type, the at least one product location, and the at least one fixture type of each product within the specific store, products inventoried within the specific store which require a pre-inventory count, to yield required pre-count tasks;
transmitting, to a manager device associated with the specific store prior to the date of the upcoming inventory:
the required pre-count tasks, to yield task assignments; and
store specific instructions for each of the task assignments, the store specific instructions based on the product type, the at least one product location, and the at least one fixture type,
where the task assignments and the store specific instructions are transmitted from the manager device to an associate device upon a manager associated with the manager device assigning the task assignments;
receiving, from the associate device and in response to the task assignments and the store specific instructions, pre-count inventory amounts for the products inventoried within the specific store which require the pre-inventory count;
modifying the pre-inventory rules based on the pre-count inventory amounts, such that future pre-count tasks and store specific instructions are generated in a distinct manner, resulting in modified pre-inventory rules, resulting in modified pre-inventory rules; and
storing the modified pre-inventory rules in the database for future iterations.

9. The system of claim 8, the computer-readable storage device having additional instructions stored which, when executed by the processor, cause the processor to perform operations comprising:
estimating prior to the transmitting of the required pre-count tasks and the store specific instructions and based on the required pre-count tasks, a risk of pre-count inventory error; and
in real-time as the pre-count inventory amounts are received, updating the risk of pre-count inventory error based on the pre-count inventory amounts.

10. The system of claim 8, the computer-readable storage device having additional instructions stored which, when executed by the processor, cause the processor comprising:
comparing the pre-count inventory amounts to a predicted inventory amount for each respective product in the products inventoried within the specific store which require a pre-inventory count, to yield a prediction comparison;
initiating, based on the prediction comparison, an audit of a specific product in the products inventoried within the specific store which require a pre-inventory count.

11. The system of claim 10, wherein the audit of the specific product is initiated due to a statistical difference between the predicted inventory amount and the pre-count inventory amount received for the specific product.

12. The system of claim 8, wherein the at least one fixture type comprises one of a stackbase, an endcap, a sidecounter; and
wherein the at least one product location comprises one of an aisle number, a department area, and a room type.

13. The system of claim 8, wherein the store specific instructions comprise multi-modal instructions, wherein the multi-modal instructions comprise at least two of: images, text, and video.

14. The system of claim 8, wherein the type of store is one of a plurality of types of stores, each type of store having defined predefined departments associated with product locations.

15. A computer-readable storage device having instructions stored which, when executed by a computing device, cause the computing device to perform operations comprising:
receiving a schedule for performing inventory at each store in a plurality of stores;
receiving a store type for each store in the plurality of stores;

receiving, from each store in the plurality of stores, product data for each product sold in a respective store, the product data comprising, for the each product:
  a product type;
  at least one product location; and
  at least one fixture type for the at least one product location;
identifying, based on the schedule, an upcoming inventory for a specific store in the plurality of stores, the upcoming inventory scheduled for a date;
retrieving, from a database, pre-inventory rules;
identifying, based on the pre-inventory rules compared to the store type, the product type, the at least one product location, and the at least one fixture type of each product within the specific store, products inventoried within the specific store which require a pre-inventory count, to yield required pre-count tasks;
transmitting, to the specific store prior to the date of the upcoming inventory:
  the required pre-count tasks, to yield task assignments; and
  store specific instructions for each of the task assignments, the store specific instructions based on the product type, the at least one product location, and the at least one fixture type;
receiving, from the specific store and in response to transmission of the task assignments and the store specific instructions, pre-count inventory amounts for the products inventoried within the specific store which require the pre-inventory count;

modifying the pre-inventory rules based on the pre-count inventory amounts, such that future pre-count tasks and store specific instructions are generated in a distinct manner, resulting in modified pre-inventory rules, resulting in modified pre-inventory rules; and
storing the modified pre-inventory rules in the database for future iterations.

16. The computer-readable storage device of claim 15, the computer-readable storage device having additional instructions stored which, when executed by the computing device, cause the computing device to perform operations comprising:
  comparing the pre-count inventory amounts to a predicted inventory amount for each respective product in the products inventoried within the specific store which require a pre-inventory count, to yield a prediction comparison;
  initiating, based on the prediction comparison, an audit of a specific product in the products inventoried within the specific store which require a pre-inventory count.

17. The computer-readable storage device of claim 16, wherein the audit of the specific product is initiated due to a statistical difference between the predicted inventory amount and the pre-count inventory amount received for the specific product.

18. The computer-readable storage device of claim 15, wherein the at least one fixture type comprises one of a stackbase, an endcap, a sidecounter; and
  wherein the at least one product location comprises one of an aisle number, a department area, and a room type.

* * * * *